(12) United States Patent
Osaki

(10) Patent No.: US 8,922,806 B2
(45) Date of Patent: Dec. 30, 2014

(54) ADMINISTRATION SERVER AND IMAGE PROCESSING SYSTEM

(75) Inventor: Fumihito Osaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 224 days.

(21) Appl. No.: 13/483,133

(22) Filed: May 30, 2012

(65) Prior Publication Data

US 2012/0307286 A1 Dec. 6, 2012

(30) Foreign Application Priority Data

May 30, 2011 (JP) ................................ 2011-121075

(51) Int. Cl.
*G06F 3/12* (2006.01)
*G06K 15/00* (2006.01)

(52) U.S. Cl.
USPC ......... 358/1.14; 358/1.13; 358/1.15; 358/1.1; 399/8; 399/9; 399/10; 709/217; 709/224; 726/2; 726/18; 726/21; 726/28; 726/33

(58) Field of Classification Search
CPC ..... G06F 21/608; G06F 3/121; G06F 3/1261; G06F 3/1234–3/1239; G06F 3/126; G06F 21/629; G06K 15/4095; H04N 1/00838; H04N 1/0084; H04N 1/00851; H04N 1/00854; H04N 1/00875; H04N 1/4406; H04N 1/4433; H04N 1/4413; H04N 1/4426; H04N 1/32523; H04N 1/32635; H04N 1/32539

USPC .......... 358/1.11–1.18, 1.9, 2.1, 504, 406, 1.1; 711/163, 164; 726/1–4, 16–21, 26–33
See application file for complete search history.

(56) References Cited

U.S. PATENT DOCUMENTS

| 8,773,683 B2 * | 7/2014 | Hamada ....................... 358/1.14 |
| 2006/0026434 A1 * | 2/2006 | Yoshida et al. ............... 713/182 |
| 2007/0078782 A1 * | 4/2007 | Ono et al. ....................... 705/67 |
| 2008/0106754 A1 * | 5/2008 | Oomori ........................ 358/1.15 |
| 2008/0130042 A1 * | 6/2008 | Iizuka et al. ................. 358/1.15 |
| 2008/0246986 A1 * | 10/2008 | Scrafford et al. ............ 358/1.15 |
| 2010/0157363 A1 * | 6/2010 | Ishikawa et al. ............. 358/1.15 |

FOREIGN PATENT DOCUMENTS

JP   2010-067111   3/2010

* cited by examiner

*Primary Examiner* — Chad Dickerson
(74) *Attorney, Agent, or Firm* — Kubotera & Associates, LLC

(57) ABSTRACT

An administration server is capable of authenticating a user. The administration server includes a communication unit for receiving a user authentication request including user identification information and apparatus identification information from an external device; and a server control unit for authenticating the user according to the user identification information to obtain a first result. The server control unit is provided for determining a usage permitted function according to the user identification information to obtain a second result, and for determining whether an apparatus corresponding to the apparatus identification information can be used according to user identification information and the apparatus identification information to obtain a third result. The communication unit is configured to transmit the first result, the second result, and the third result to the external device.

11 Claims, 12 Drawing Sheets

| Display name | Qualification information | | Mail address | User information | | Function usage permission setting | |
|---|---|---|---|---|---|---|---|
| | Title | Department | | User ID | Password | Printing function | "Scan-to-FAX" function |
| Sato | G. M. | First Sales Dept. | satou@xxx.xx | satou | *** | Permitted | Permitted |
| Kimura | D. M. | First Sales Dept. | kimura@xxx.xx | kimura | *** | Permitted | Not permitted |
| Tanaka | G. S. | First Sales Dept. | tanaka@xxx.xx | tanaka | *** | Not permitted | Not permitted |
| Suzuki | G. S. | General Affair Dept. | suzuki@xxx.xx | suzuki | *** | Not permitted | Permitted |

FIG. 5

| Qualification information | | Usage permitted apparatus |
|---|---|---|
| Title | Department | |
| General Manager | First Sales Department | ALL |
| Department Manager | First Sales Department | 0057AH895F73 |
| General Staff | First Sales Department | 0057AH895F74 |
| General Staff | General Affair Department | 0057AH895HGE |

FIG. 6

```
%-12345X
@PJL AUXJOBINFO DATA="UserID=tanaka"
@PJL AUXJOBINFO SECURE PASSWORD=***
@PJL AUXJOBINFO DATA="SendTime=xx:xx:xx xxxx/xx/xx"
@PJL AUXJOBINFO DATA="DocumentName=Work_report09.doc"
%-12345X@PJL ENTER LANGUAGE=PCL ~~~~~~~~~~
  Print data
~~~~~~~~~~

@PJL EOJ NAME="End"
%-12345X
```

FIG. 7

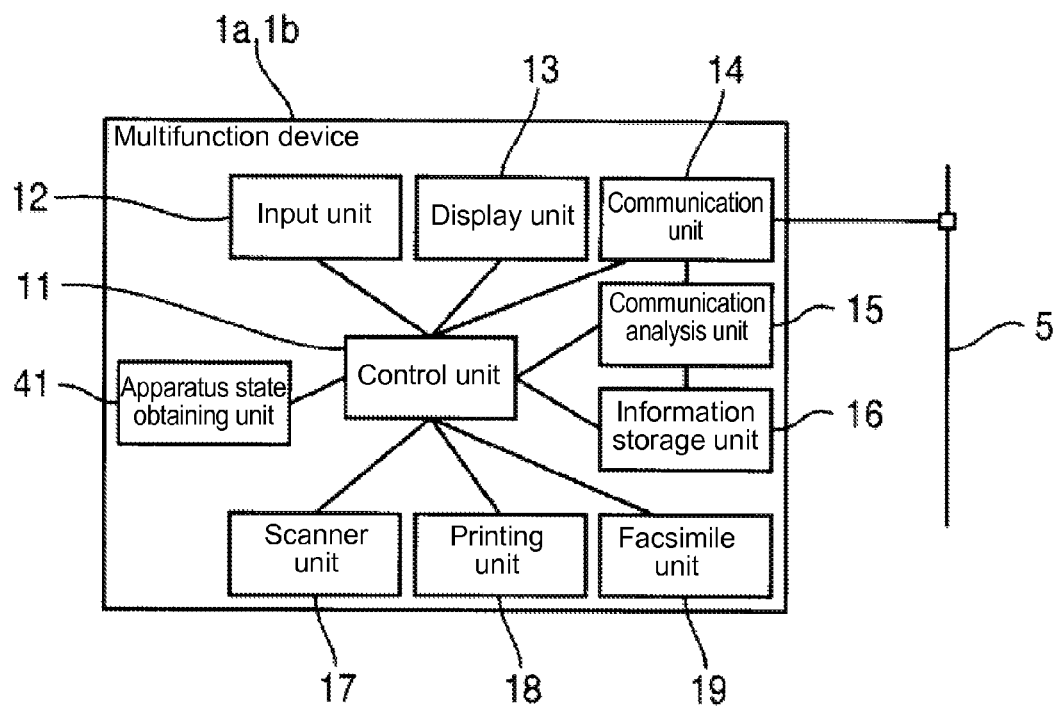

FIG. 14

| Qualification information | | Usage permitted apparatus | Temporary usage permission setting |
|---|---|---|---|
| Title | Department | | |
| General Manager | First Sales Department | ALL | Permitted |
| Department Manager | First Sales Department | 0057AH895F73 (xx.xx.xx.00) | Permitted |
| General Staff | First Sales Department | 0057AH895F74 (xx.xx.xx.00) | Permitted |
| General Staff | General Affair Department | 0057AH895HGE (xx.xx.xx.01) | Not permitted |

FIG. 15

ADMINISTRATION SERVER AND IMAGE PROCESSING SYSTEM

BACKGROUND OF THE INVENTION AND RELATED ART STATEMENT

This application relates to an administration server and an image processing system. More specifically, the application relates to an administration server and an image processing system having an image forming apparatus whose access and execution of a processing operation are restricted per user.

In a conventional image processing system, at least one image forming apparatus is connected to an IC card authentication device and an IC card authentication server through a network. The image forming apparatus includes a scanner unit, a printing unit, a facsimile unit, and the like.

In the conventional image processing system, the IC card authentication device retrieves user authentication information from an IC card of a user, and transmits the user authentication information to the IC card authentication server. The IC card authentication server determines whether the user authentication information is registered in user authentication information database, so that the IC card authentication server authenticates the user according to a determination result. Then, the IC card authentication server transmits access control information to the IC card authentication device according to a user ID. The access control information includes an image forming function of the image forming apparatus such as a printing operation permitted to the user.

Further, in the conventional image processing system, the IC card authentication device identifies the image forming apparatus that is permitted to use, and a selection menu of the image forming apparatus is displayed on a display unit. When the IC card authentication device receives a selection that the user inputs, the IC card authentication device generates an access control command according to the access control information thus received, and transmits the access control command to the image forming apparatus thus selected. The image forming apparatus displays a function selection menu, in which only the image forming function is permitted according to the access control command thus received, on an operation panel thereof. Accordingly, it is possible to authenticate the user and the access control of the image forming apparatus per user (refer to Patent Reference).

Patent Reference: Japanese Patent Publication No. 2010-67111

In the conventional image processing system disclosed in Patent Reference, it is difficult to permit a usage of only the image forming apparatus limited to a specific user.

SUMMARY OF THE INVENTION

In order to attain the objects described above, according to one aspect, an administration server is capable of authenticating a user. The administration server includes a communication unit for receiving a user authentication request including user identification information and apparatus identification information from an external device; and a server control unit for authenticating the user according to the user identification information to obtain a first result, for determining whether an apparatus corresponding to the apparatus identification information can be used according to the user identification information and the apparatus identification information to obtain a second result, and for obtaining usage permitted function information indicating a usage permitted function according to the user identification information.

Further, the communication unit is configured to transmit the first result, the second result, and the usage permitted function information to the external device.

According to another aspect, an image processing system includes an image processing apparatus having a plurality of image processing functions, and an administration server capable of authenticating a user.

Further, the image processing apparatus includes an information storage unit for storing apparatus identification information of the image processing apparatus; an obtaining unit for obtaining user identification information; and a control unit for transmitting the apparatus identification information and the user identification information as a user authentication request to the administration server.

Further, the administration server includes a communication unit for receiving the user authentication request including the user identification information and the apparatus identification information from the image processing apparatus; and a server control unit for authenticating the user according to the user identification information to obtain a first result, for determining whether an apparatus corresponding to the apparatus identification information can be used according to the user identification information and the apparatus identification information to obtain a second result, and for obtaining usage permitted function information indicating a usage permitted function according to the user identification information.

Further, the communication unit is configured to transmit the first result, the second result, and the usage permitted function information to the image processing apparatus.

BRIEF DESCRIPTION OF THE DRAWINGS

FIG. 5 is a schematic view showing an example of a configuration of user administration information of the image processing system according to the first embodiment of the present invention;

FIG. 6 is a schematic view showing an example of a configuration of apparatus usage permission information of the image processing system according to the first embodiment of the present invention;

FIG. 7 is a schematic view showing an example of a configuration of a print job of the image processing system according to the first embodiment of the present invention;

FIG. 14 is a block diagram showing a configuration of a multifunction device of the image processing system according to the second embodiment of the present invention;

FIG. 15 is a schematic view showing an example of a configuration of apparatus usage permission information of the image processing system according to the second embodiment of the present invention;

DETAILED DESCRIPTION OF PREFERRED EMBODIMENTS

Hereunder, embodiments of the present invention will be explained with reference to the accompanying drawings. It is noted that the drawings are presented for an explanation purpose only, and the present invention is not limited to the embodiments.

First Embodiment

Figure 1:
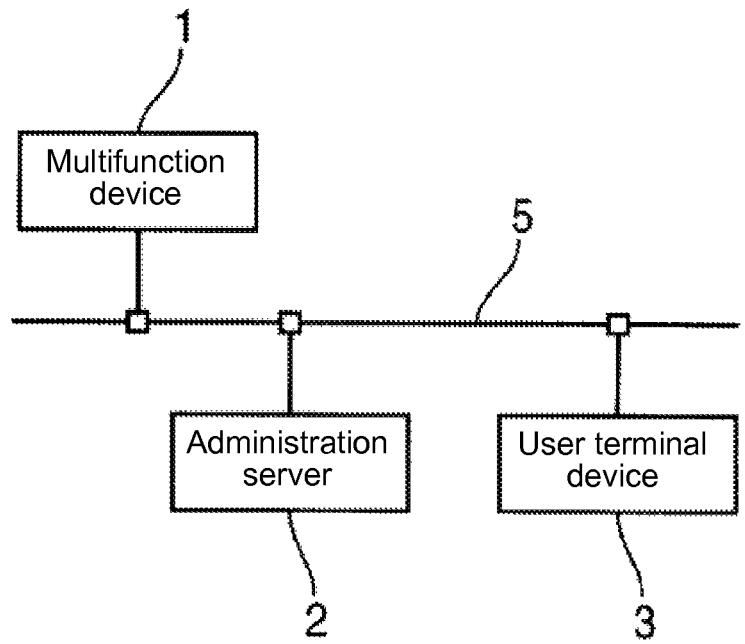
FIG. 1 is a block diagram showing a configuration of an image processing system according to a first embodiment of the present invention.

A first embodiment of the present invention will be explained. FIG. 1 is a block diagram showing a configuration of an image processing system according to the first embodiment of the present invention.

As shown in FIG. 1, the image processing system includes a multifunction device 1 (a multifunction peripheral, MFP) as an image forming apparatus, an administration server 2, and a user terminal device 3 such as a personal computer and the like. The multifunction device 1, the administration server 2, and the user terminal device 3 are mutually connected through a network 5 such as an LAN (Local Area Network). The network 5 is provided for providing an environment that enables mutual communication among the multifunction device 1, the administration server 2 and the user terminal device 3.

Figure 2:
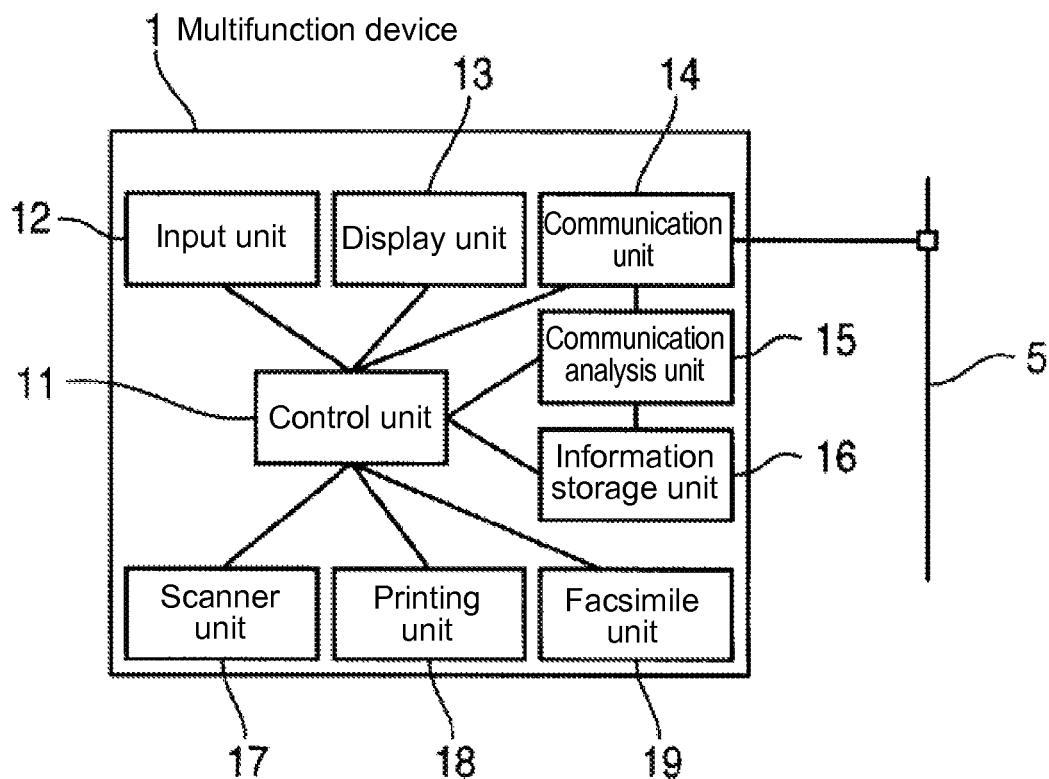
FIG. 2 is a block diagram showing a configuration of a multifunction device of the image processing system according to the first embodiment of the present invention.

FIG. 2 is a block diagram showing a configuration of the multifunction device 1 of the image processing system according to the first embodiment of the present invention.

As shown in FIG. 2, the multifunction device 1 includes a control unit 11 for controlling each component of the multifunction device 1 according to a program installed in the multifunction device 1; an input unit 12 for receiving an input of information such as user information and the like from a user to the multifunction device 1; a display unit 13 for displaying a state of the multifunction device 1 and the like; a communication unit 14 for performing communication externally through the network 5; a communication analysis unit 15 for analyzing the information obtained from the communication unit 14; and an information storage unit 16 for storing a print job thus received, user administration information, and various types of information to be used for the control. The input unit 12 and the display unit 13 may be integrated to constitute an operation panel.

In the embodiment, the multifunction device 1 further includes a scanner unit 17 having a function of reading an image and image data of an original document; a printing unit 18 having a function of printing print data as the image data thus received, the image data read out with the scanner unit 17, and the like; and a facsimile unit 19 having a function of transmitting the image data specified and the like to a specified destination.

In the embodiment, the scanner unit 17, the printing unit 18, and the facsimile unit 19 constitute an image processing unit. It is configured such that one or a combination of the scanner unit 17, the printing unit 18, and the facsimile unit 19 perform a processing operation of an image processing function such as color copying, printing of the print data, and the like. Further, the information storage unit 16 of the multifunction device 1 is configured to store an apparatus identification mark specific to an apparatus (described later) in advance.

Figure 3:
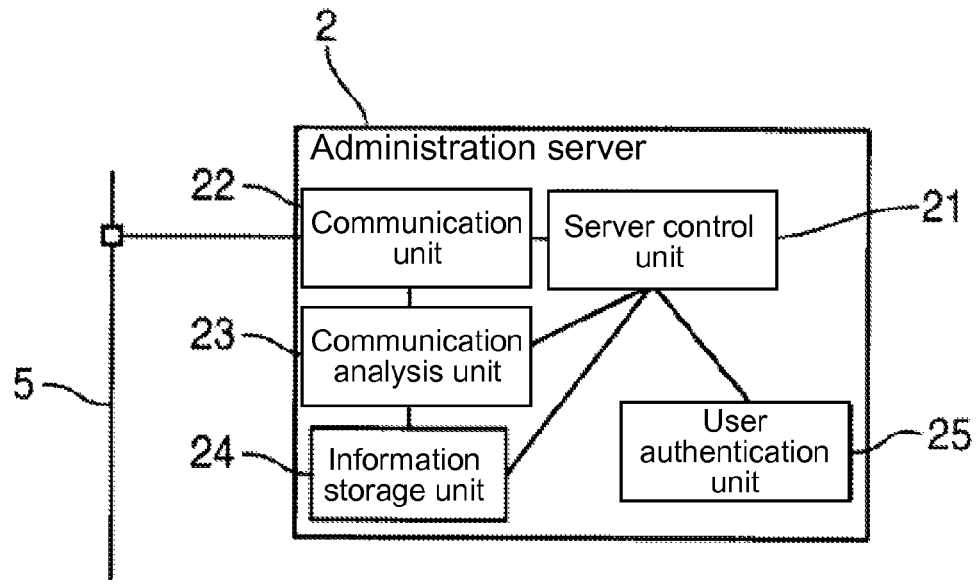
FIG. 3 is a block diagram showing a configuration of an administration server of the image processing system according to the first embodiment of the present invention.

FIG. 3 is a block diagram showing a configuration of the administration server 2 of the image processing system according to the first embodiment of the present invention.

As shown in FIG. 3, the administration server 2 includes a server control unit 21 for controlling each component of the administration server 2 according to a program installed; a communication unit 22 for performing communication externally through the network 5; a communication analysis unit 23 having a function of analyzing the information obtained from the communication unit 22; an information storage unit 24 for storing the user administration information (described later) and apparatus usage permission information; and a user authentication unit 25 having a function of performing an authentication operation with respect to the user.

Figure 4:
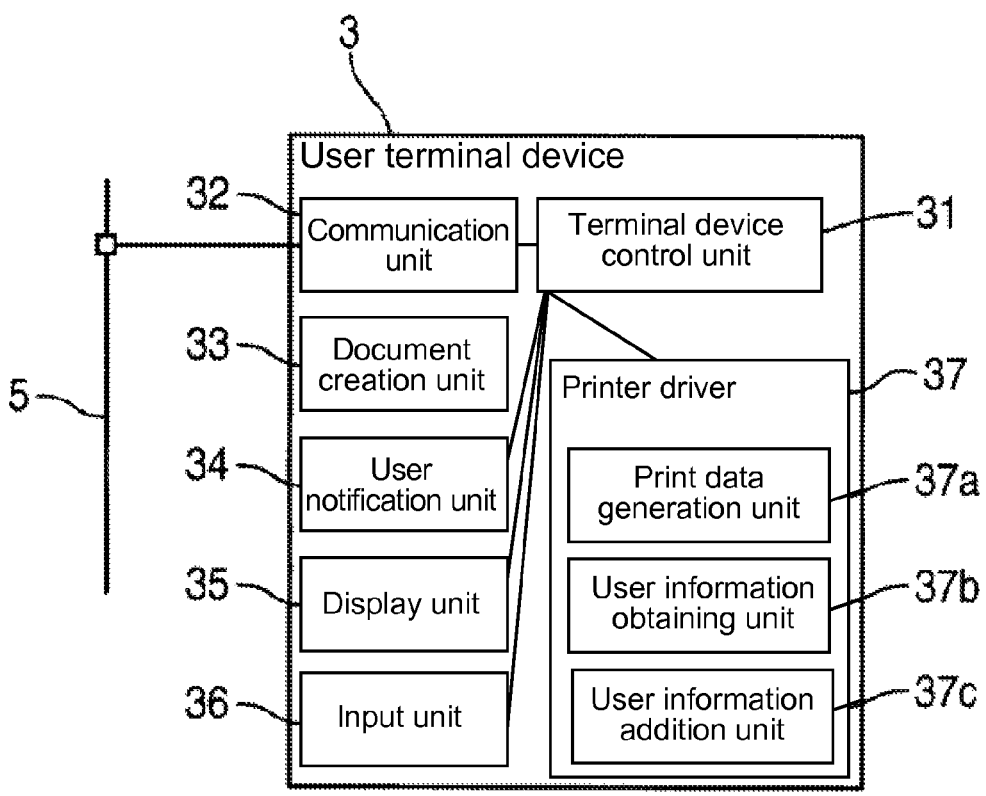
FIG. 4 is a block diagram showing a configuration of a user terminal device of the image processing system according to the first embodiment of the present invention.

FIG. 4 is a block diagram showing a configuration of the user terminal device 3 of the image processing system according to the first embodiment of the present invention.

As shown in FIG. 4, the user terminal device 3 includes a terminal device control unit 31 for controlling each component of the user terminal device 3 according to a program installed therein; a communication unit 32 for performing communication externally through the network 5; a document creation unit 33 including an application program such as a word processing for creating a print document and the like; a user notification unit 34 for generating screen data for notifying information received from the multifunction device 1 to the user through a popup message; a display unit 35 for displaying message data generated with the user notification unit 34 and the like; an input unit 36 for receiving an input of information such as the user information from the user to the user terminal device 3 and document information; and a printer driver 37.

In the embodiment, the printer driver 37 includes a print data generation unit 37a for generating the print data; a user information obtaining unit 37b for obtaining the user information; and a user information addition unit 37c for adding the user information obtained with the user information obtaining unit 37b to the print data generated with the print data generation unit 37a.

FIG. 5 is a schematic view showing an example of a configuration of the user administration information of the image processing system according to the first embodiment of the present invention.

As described above, the user administration information is stored in the information storage unit 24 of the administration server 2. As shown in FIG. 5, the user administration information includes a display name representing a name of the user registered in the image processing system; qualification information representing a group to which the user of the display name belongs and including a title in an organization and a department indicating a belonged department; a mail address of the user; the user information including a user ID as a user identification mark specific to the user and a password defined by the user; and a function usage permission setting for setting usage permission of the image processing functions of the multifunction device 1. The image processing functions include the printing function and a "Scan-to-FAX" function.

As shown in FIG. 5, the display name, the qualification information, the mail address, and the function usage permission setting are correlated to the user information. In the embodiment, it is supposed that the user administration information of the display name "Sato", the display name "Kimura", the display name "Tanaka", and the display name "Suzuki" is stored.

FIG. 6 is a schematic view showing an example of a configuration of the apparatus usage permission information of the image processing system according to the first embodiment of the present invention.

In the embodiment, the apparatus usage permission information is set and stored in advance. As shown in FIG. 6, the apparatus usage permission information includes the qualification information including the title and the department, and a usage permitted apparatus indicating the multifunction device 1 whose usage is permitted to the user belonging to the group of the qualification information.

In the embodiment, for example, the apparatus usage permission information is associated with the user belonging to the group having the title "General Manager" and the department "First Sales Department", the user belonging to the group having the title "Department Manager" and the department "First Sales Department", the user belonging to the group having the title "General Staff" and the department "First Sales Department", and the user belonging to the group having the title "General Staff" and the department "General Affair Department".

As described above, the usage permitted apparatus represents an apparatus whose usage is permitted, and indicates which apparatus can be used by the user in each group. In the embodiment, an MAC (Media Access Control Address) address is used as the apparatus identification mark specific to the apparatus for identifying the multifunction device 1. In this case, when the usage permitted apparatus shows "ALL", all of the apparatus are permitted to use.

In the embodiment, the qualification information is formed of the combination of the title and the department, so that the usage permitted apparatus is identified accordingly. Alternatively, the qualification information may be formed of an individual name and the like, so that the usage permitted apparatus is identified accordingly. Further, a serial number of the multifunction device 1 and the like may be used as the apparatus identification mark specific to the apparatus.

In the embodiment, in the image processing system, for example, when the printing operation of the print document is performed using the printing function, one of the image processing functions of the multifunction device 1, the user operates the input unit 36 of the user terminal device 3 to create the print document such as a text document. Then, the user inputs the user ID and the password of the user through the input unit 36. Further, the user inputs an execution instruction of the printing function.

In the embodiment, when the terminal device control unit 31 of the user terminal device 3 receives the input of the user information and the execution instruction, the user information addition unit 37c adds the user information thus input and obtained with the user information obtaining unit 37b to the print data of the print document generated with the print data generation unit 37a. Accordingly, the user information addition unit 37c generates the print job, and transmits the print job to the multifunction device 1 through the network 5.

FIG. 7 is a schematic view showing an example of a configuration of the print job of the image processing system according to the first embodiment of the present invention.

As shown in FIG. 7, the print job is data defined with a language such as PJL (Printer Job Language) as a printer description language. The print job includes the user ID, the password, a transmission time of the print job, a name of the print document, a statement indicating the language of the print data, contents of the print data, and a statement indicating an end of the print job.

Figure 8:
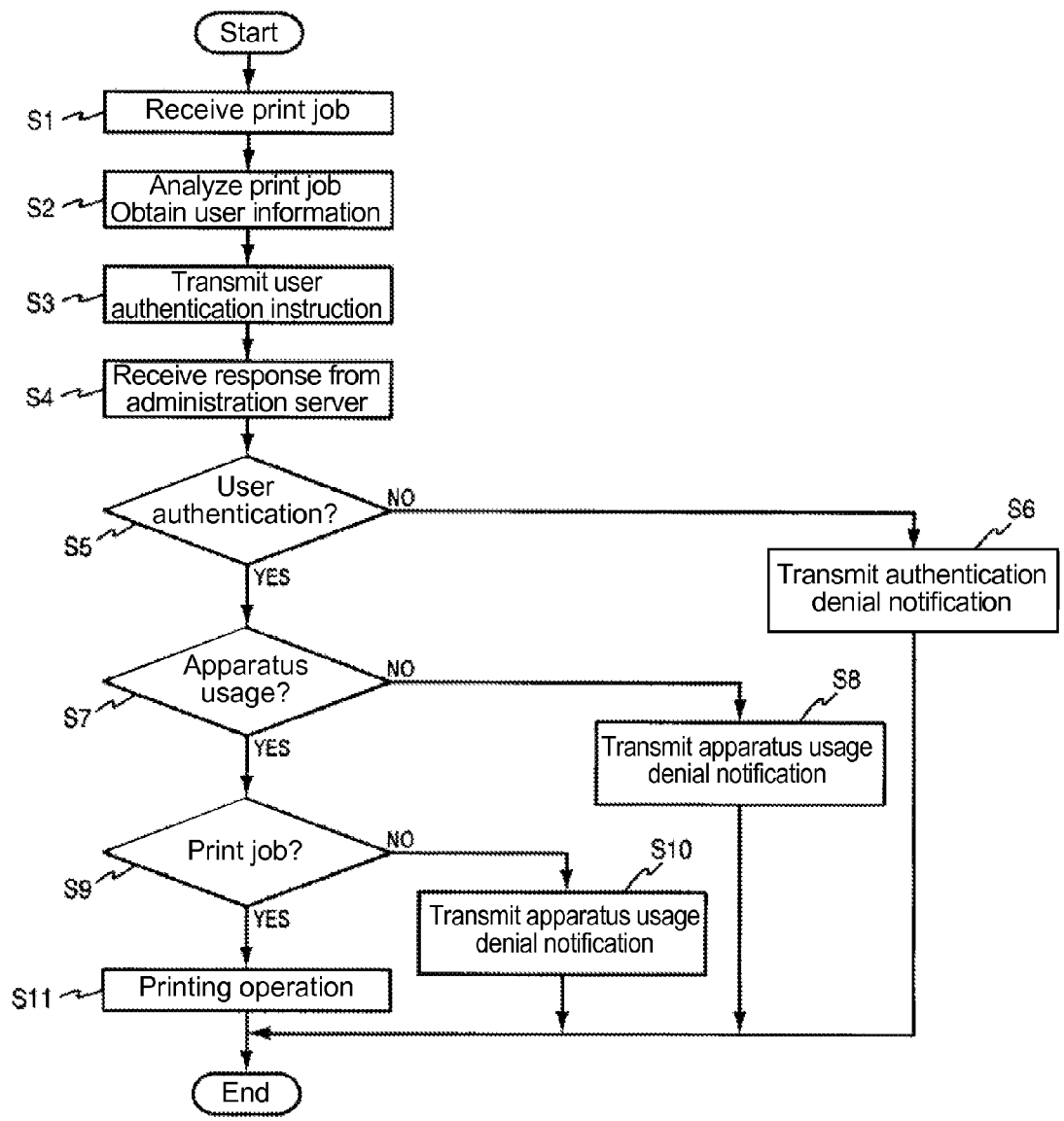
FIG. 8 is a flow chart showing an operation of the multifunction device of the image processing system in a printing operation according to the first embodiment of the present invention.

An operation of the multifunction device 1 in the printing operation, one of the image processing functions of the multifunction device 1, will be explained next with reference to a flow chart shown in FIG. 8. FIG. 8 is the flow chart showing the operation of the multifunction device 1 of the image processing system in the printing operation when the multifunction device 1 receives the print job from the user terminal device 3 according to the first embodiment of the present invention.

In step S1, the control unit 11 of the multifunction device 1 controls the communication unit 14 to receive the print job (refer to FIG. 7) generated with the printer driver 37 of the user terminal device 3. The print job thus received is stored in the information storage unit 16. In step S2, after the control unit 11 receives the print job, the communication analysis unit 15 analyzes the print job thus received to obtain the user information including the user ID and the password. The user information thus obtained is stored in the information storage unit 16. In the embodiment, the user ID "tanaka" and the password corresponding to the user ID are obtained.

In step S3, after the control unit 11 obtains the user information, the control unit 11 transmits the user authentication instruction to the administration server 2 through the network 5 (refer to step SB1 shown in FIG. 12, described later). The user authentication instruction includes the user information thus obtained and the apparatus identification mark read from the information storage unit 16. For example, in the embodiment, the apparatus identification mark of the multifunction device 1 read from the information storage unit 16 is "0057AH895F74".

After the control unit 11 transmits the user authentication instruction, the control unit 11 waits for the response from the administration server 2 (refer to step SB5, step SB8, step SB9 shown in FIG. 12, described later). In step S4, when the control unit 11 receives the response from the administration server 2, the process proceeds to step S5.

Figure 12:
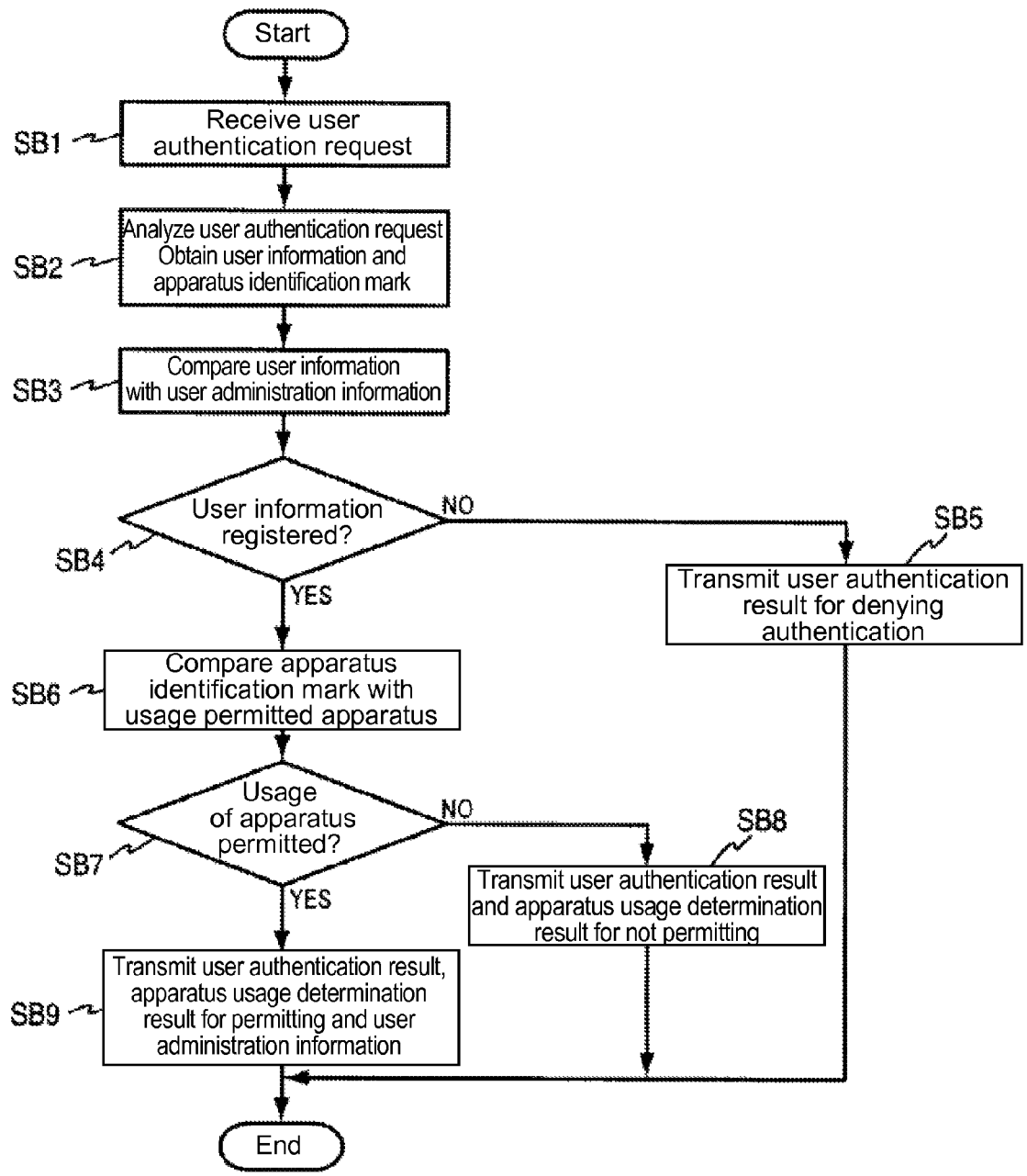
FIG. 12 is a flow chart showing an operation of the administration server of the image processing system in a user authentication operation according to the first embodiment of the present invention.

More specifically, in the embodiment, the administration server 2 transmits to the multifunction device 1 the user authentication result for denying the authentication of the user of the user information thus transmitted in step SB5 shown in FIG. 12. In step SB8 shown in FIG. 12, the administration server 2 transmits to the multifunction device 1 the user authentication result for authenticating the user of the user information thus transmitted and the apparatus usage determination result for not permitting the usage of the apparatus (that is, the multifunction device 1 that receives the print job).

Further, in step SB 9 shown in FIG. 12, the administration server 2 transmits to the multifunction device 1 the user authentication result for authenticating the user of the user information thus transmitted, the apparatus usage determination result for permitting the usage of the apparatus, and the user administration information corresponding to the user information thus transmitted. In the embodiment, the control unit 11 receives the user authentication result for authenticating the user having the user ID "tanaka", the apparatus usage determination result for permitting the usage of the apparatus, and the user administration information of the display name "Tanaka" shown in FIG. 5.

In step S5, when the control unit 11 receives the response from the administration server 2, the control unit 11 determines whether the response is the user authentication result for denying the authentication of the user. When the control unit 11 determines that the response is the user authentication result for denying the authentication of the user (No in step S5), the process proceeds to step S6. When the control unit 11 determines that the response is the user authentication result for authenticating the authentication of the user (Yes in step S5), the process proceeds to step S7.

In the embodiment, when the control unit 11 receives the user authentication result for denying the authentication of the user, the control unit 11 recognizes that the user receiving the print job is not registered as the user of the image processing system. Accordingly, in step S6, the control unit 11 transmits an authentication denial notification indicating that the user is not registered to the user terminal device 3 as the transmission originator of the print job through the network 5, thereby completing the printing operation.

In the embodiment, when the terminal device control unit 31 of the user terminal device 3 receives the authentication denial notification, the terminal device control unit 31 of the user terminal device 3 controls the user notification unit 34 to generate screen data of a non-registration notification screen displaying a text indicating that the user is not registered. Accordingly, the non-registration notification screen is displayed on the display unit 35, so that the user is notified that the user transmitting the print job is not registered in the administration server 2.

In step S7, when the control unit 11 receives the response from the administration server 2, the control unit 11 determines whether the response is the apparatus usage determination result for not permitting the usage of the apparatus. When the control unit 11 determines that the response is the apparatus usage determination result for not permitting the usage of the apparatus (No in step S7), the process proceeds to step S8. When the control unit 11 determines that the response is the apparatus usage determination result for permitting the usage of the apparatus (Yes in step S7), the process proceeds to step S9.

In the embodiment, when the control unit 11 receives the apparatus usage determination result for not permitting the usage of the apparatus, the control unit 11 recognizes that the user receiving the print job is not permitted to use the apparatus. Accordingly, in step S8, the control unit 11 transmits an apparatus usage denial notification indicating that the multifunction device 1 is not permitted to use to the user terminal device 3 as the transmission originator of the print job through the network 5, thereby completing the printing operation.

In the embodiment, when the terminal device control unit 31 of the user terminal device 3 receives the apparatus usage denial notification, the terminal device control unit 31 of the user terminal device 3 controls the user notification unit 34 to generate screen data of a print job denial notification screen indicating that the multifunction device 1 is not permitted to use. Accordingly, the print job denial notification screen is displayed on the display unit 35, so that the user is notified that the printing operation of the print job is denied by the administration server 2.

Figure 9:
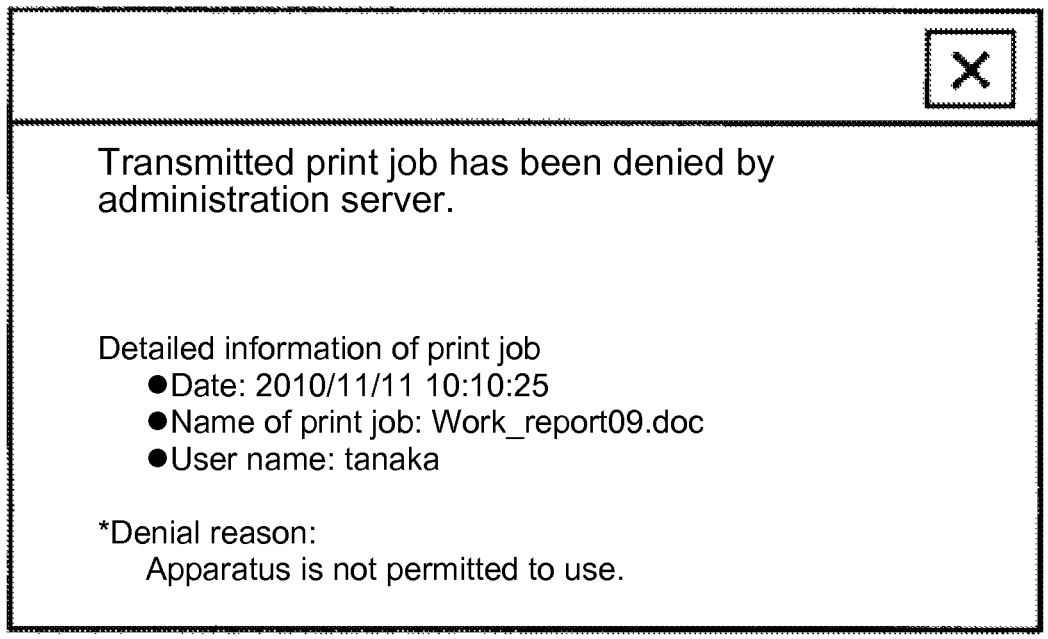
FIG. 9 is a schematic view showing an example of a print job denial notification screen of the image processing system according to the first embodiment of the present invention.

FIG. 9 is a schematic view showing an example of the print job denial notification screen of the image processing system 1 according to the first embodiment of the present invention.

As shown in FIG. 9, the print job denial notification screen displays a popup message including a statement indicating that the print job is denied, detailed information of the print job, and a denial reason "Apparatus is not permitted to use". The detailed information of the print job includes a date of transmitting the print job, a name of the print job, and the user ID (the user name) of the user transmitting the print job.

In step S9, after the control unit 11 determines that the user transmitting the print job is permitted to use the multifunction device 1, the control unit 11 determines whether the printing operation is permitted to use according to the function usage permission setting of the user administration information thus received. When the control unit 11 determines that the printing operation is not permitted to use (No in step S9), the process proceeds to step S10. When the control unit 11 determines that the printing operation is permitted to use (Yes in step S9), the process proceeds to step S11.

In step S10, when the control unit 11 recognizes that the user transmitting the print job is not permitted to use the printing function of the multifunction device 1, the control unit 11 transmits the apparatus usage denial notification indicating that the printing function of the multifunction device 1 is not permitted to use to the user terminal device 3 as the transmission originator of the print job through the network 5, thereby completing the printing operation.

In the embodiment, when the terminal device control unit 31 of the user terminal device 3 receives the apparatus usage denial notification, the terminal device control unit 31 of the user terminal device 3 controls the user notification unit 34 to generate the screen data of the print job denial notification screen shown in FIG. 9. Accordingly, the print job denial notification screen is displayed on the display unit 35, so that the user is notified that the printing operation of the print job is denied by the administration server 2 and the denial reason is "Function of apparatus is not permitted to use".

In step S11, when the control unit 11 recognizes that the user transmitting the print job is permitted to use the multifunction device 1 and further the printing function of the multifunction device 1, the control unit 11 controls the printing unit 18 to perform the printing operation of the print job, thereby completing the printing operation. Accordingly, in the embodiment, when the multifunction device 1 performs the printing operation, it is possible to permit only the multifunction device 1 thus restricted to perform only the image forming function thus restricted relative to the specific user.

In the image processing system in the embodiment, when a color copying operation is performed on the original document using a color copy function, one of the image processing functions of the multifunction device 1, the user first sets the original document on the scanner unit 17 of the multifunction device 1. Then, the user inputs the user information including the user ID and the password, and inputs the execution instruction of the color copy function.

Figure 10:
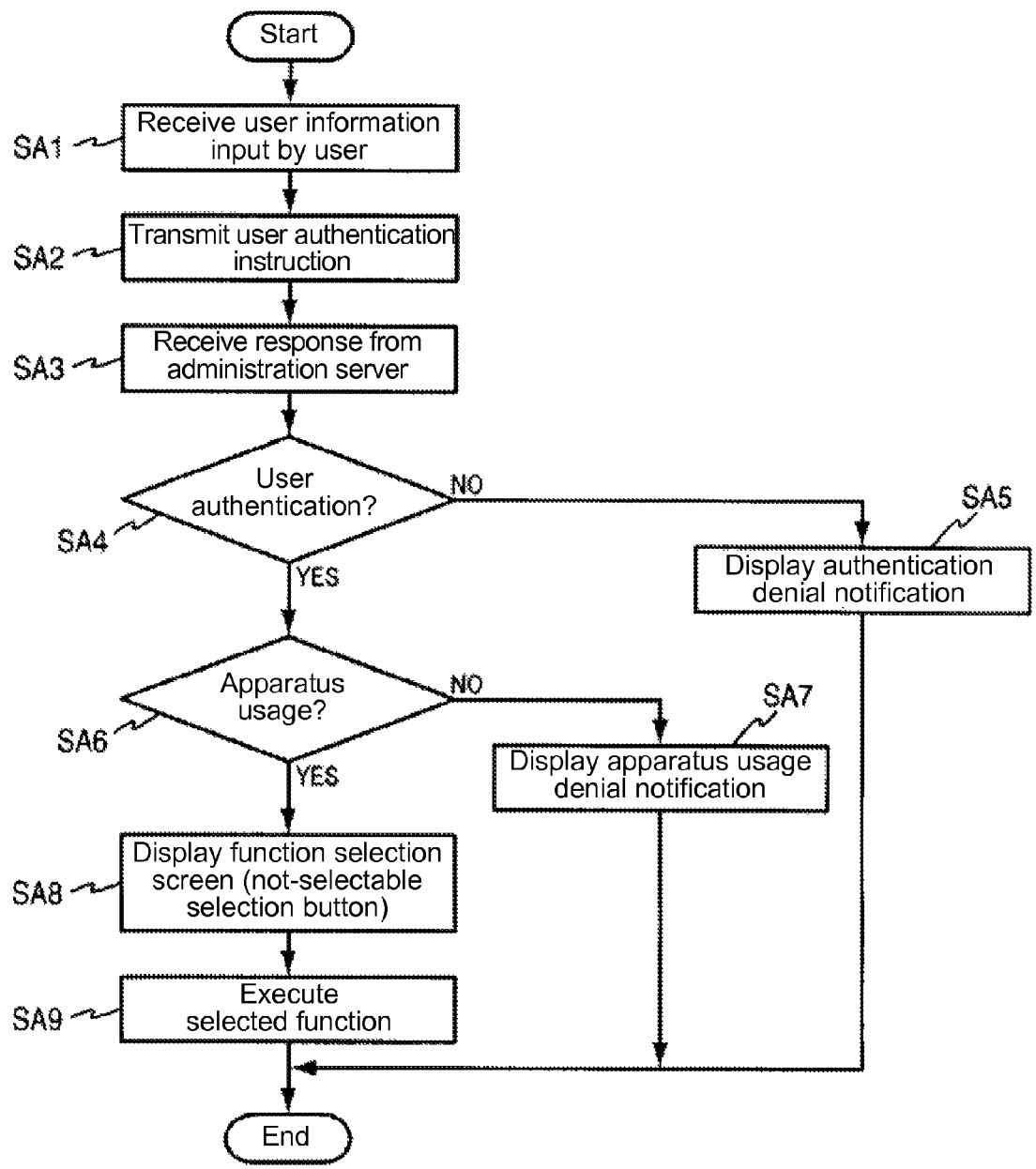
FIG. 10 is a flow chart showing an operation of the multi function device of the image processing system in a function usage operation according to the first embodiment of the present invention.

An operation of the multi function device 1 of the image processing system in a function usage operation will be explained next with reference to a flow chart shown in FIG. 10. FIG. 10 is the flow chart showing the operation of the multi function device 1 of the image processing system in the function usage operation when the user inputs the user information through the input unit 12 of the multifunction device 1 to use the color copy function of the multifunction device 1 as one of the image processing functions thereof according to the first embodiment of the present invention.

In step SA1, the control unit 11 of the multifunction device 1 receives the user information formed of the user ID and the password input by the user. The user information thus received is stored in the information storage unit 16. In the embodiment, it is supposed that the user inputs the user ID "tanaka" and the password corresponding to the user ID.

In step SA2, after the control unit 11 receives the user information, the control unit 11 transmits the user authentication request to the administration server 2 through the network 5 (refer to step SB1 shown in FIG. 12, described later). It is noted that the user information thus input and the apparatus identification mark read from the information storage unit 16 are attached to the user authentication request.

In the embodiment, after the control unit 11 transmits the user authentication request, the control unit 11 waits for the response from the administration server 2 (refer to step SB5, step SB8, step SB9 shown in FIG. 12, described later). In step SA3, when the control unit 11 receives the response from the administration server 2, the process proceeds to step SA4. Contents of the response from the administration server 2 are similar to those in step S4, and explanations thereof are omitted.

In the embodiment, the control unit 11 receives the user authentication result for authenticating the user having the user ID "tanaka", the apparatus usage determination result for permitting the usage of the apparatus, and the user administration information of the display name "Tanaka" shown in FIG. 5.

In step SA4, when the control unit 11 receives the response from the administration server 2, the control unit 11 determines whether the response is the user authentication result for denying the authentication of the user. When the control unit 11 determines that the response is the user authentication result for denying the authentication of the user (No in step SA4), the process proceeds to step SA5. When the control unit 11 determines that the response is the user authentication result for authenticating the authentication of the user (Yes in step SA4), the process proceeds to step SA6.

In the embodiment, when the control unit 11 receives the user authentication result for denying the authentication of the user, the control unit 11 recognizes that the user who inputs the user information is not registered as the user of the image processing system. In step SA5, the control unit 11 displays the authentication denial notification on the display unit 13, so that the user is notified that the user who inputs the user information is not registered in the administration server 2, there by completing the function usage operation.

In step SA6, when the control unit 11 receives the response from the administration server 2, the control unit 11 determines whether the response is the apparatus usage determination result for not permitting the usage of the apparatus. When the control unit 11 determines that the response is the apparatus usage determination result for not permitting the usage of the apparatus (No in step SA6), the process proceeds to step SA7. When the control unit 11 determines that the response is the apparatus usage determination result for permitting the usage of the apparatus (Yes in step SA6), the process proceeds to step SA8.

In the embodiment, when the control unit 11 receives the apparatus usage determination result for not permitting the usage of the apparatus, the control unit 11 recognizes that the user inputting the user information is not permitted to use the apparatus. Accordingly, in step SA7, the control unit 11 displays the apparatus usage denial notification on the display unit 13 indicating that the multifunction device 1 is not permitted to, so that the user is notified that the function usage operation is denied by the administration server 2, thereby completing the function usage operation.

In the embodiment, when the control unit 11 receives the apparatus usage determination result for permitting the usage of the apparatus, the control unit 11 recognizes that the user inputting the user information is permitted to use the apparatus. Accordingly, in step SA8, the control unit 11 determines which of the image processing functions is permitted to use according to the function usage permission setting of the user administration information thus received. Then, the control unit 11 displays the function selection screen on the display unit 13, on which the selection button of the image processing function not permitted becomes not-selectable.

Figure 11:
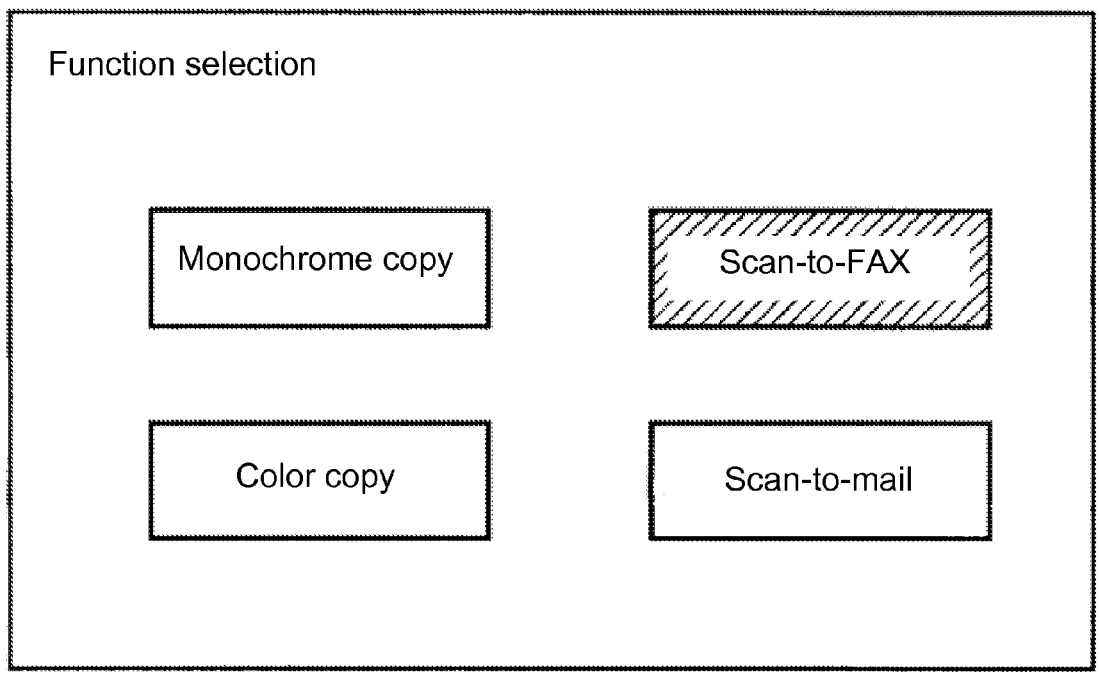
FIG. 11 is a schematic view showing an example of a function selection screen displayed on an operation panel of the image processing system according to the first embodiment of the present invention.

FIG. 11 is a schematic view showing an example of the function selection screen displayed on the operation panel of the image processing system according to the first embodiment of the present invention.

As shown in FIG. 11, a plurality of selection buttons is displayed on the function selection screen, so that the user can select the image processing functions of the multifunction device 1. As described above, the image processing system is configured such that each of the selection buttons can be controlled to become selectable or not-selectable according to the function usage permission setting of the user administration information.

More specifically, as shown in FIG. 11, the selection button "Scan-to-FAX" is hatched indicating that the function is not-selectable. On the other hand, the selection button "Monochrome copy", the selection button "Color copy", and the selection button "Scan-to-mail" are not set in the function usage permission setting, and are not hatched indicating that the functions are selectable. In the embodiment, it is supposed that the user pushes the selection button "Color copy".

In step SA9, when the control unit 11 recognizes that the user pushes the selection button, the control unit 11 executes the function selected with the selection button, thereby completing the function usage operation. As described above, it is supposed that the user pushes the selection button "Color copy". Accordingly, the control unit 11 of the multifunction device 1 executes the processing operation of the color copy function, in which the control unit 11 controls the scanner unit 17 to read the image data of the original thus set, so that the printing unit 18 performs the printing operation of the image data.

As described above, in the embodiment, the processing operation of the color copy function is executed, in which the multifunction device 1 thus limited can perform only the limited one of the image processing functions relative to the specific user.

An operation of the administration server 2 of the image processing system in a user authentication operation will be explained next with reference to a flow chart shown in FIG. 12. FIG. 12 is the flow chart showing the operation of the administration server 2 of the image processing system in the user authentication operation when the multifunction device 1 transmits the user authentication request with the user information and the apparatus identification mark attached thereto according to the first embodiment of the present invention.

in step SB1, the server control unit 21 of the administration server 2 controls the communication unit 22 to receive the user authentication request from the multifunction device 1 (refer to step S3 shown in FIG. 8, step SA2 shown in FIG. 10).

In step SB2, after the server control unit 21 receives the user authentication request, the communication analysis unit 23 analyzes the user authentication request thus received to obtain the user information formed of the user ID and the password and the apparatus identification mark of the multifunction device 1 that transmits the user authentication request. In the embodiment, the user ID "tanaka", the password corresponding to the user ID, the apparatus identification mark of the multifunction device 1 as the transmission originator are obtained.

In step SB3, after the server control unit 21 obtains the user information and the apparatus identification mark, the server control unit 21 controls the user authentication unit 25 to compare the user information thus obtained with the user administration information stored in the information storage unit 24 (refer to FIG. 5).

In step SB4, after the server control unit 21 compares the user information with the user administration information, the server control unit 21 determines whether the user information is registered through determining whether there is the user information matching to the user information of the user authentication request in the user administration information. When the server control unit 21 determines that the user information is not registered (No in step SB4), the process proceeds to step SB5. When the server control unit 21 determines that the user information is registered (Yes in step SB4), the process proceeds to step SB6.

In step SB5, after the server control unit 21 determines that the user information is not registered, the server control unit 21 transmits the user authentication result for denying the authentication of the user of the user information thus received to the multifunction device 1 as the transmission originator of the user authentication request through the network 5 (refer to step S4 shown in FIG. 8, step SA3 shown in FIG. 10), thereby completing the user authentication operation.

In the embodiment, after the server control unit 21 determines that the user information is registered, the server control unit 21 reads the user administration information corresponding to the user information from the information storage unit 24. Then, the server control unit 21 retrieves the usage permitted apparatus corresponding to the qualification information from the apparatus usage permission information stored in the information storage unit 24 according to the qualification information of the user administration information. In step SB6, the server control unit 21 compares the apparatus identification mark obtained from the user authentication request with the usage permitted apparatus.

In step SB7, after the server control unit 21 compares the apparatus identification mark with the usage permitted apparatus, the server control unit 21 determines whether the usage of the apparatus is permitted through determining whether the apparatus identification mark is included in the usage permitted apparatus. When the server control unit 21 determines that the usage of the apparatus is not permitted (No in step SB7), the server control unit 21 determines that the usage of the multifunction device 1 as the transmission originator is not permitted, and the process proceeds to step SB8. When the server control unit 21 determines that the usage of the apparatus is permitted (including direct match, Yes in step SB7), the server control unit 21 determines that the usage of the multifunction device 1 as the transmission originator is permitted, and the process proceeds to step SB9.

In step SB8, after the server control unit 21 determines that the usage of the multifunction device 1 as the transmission originator is not permitted, the server control unit 21 transmits the user authentication result for authenticating the user of the user information thus received and the apparatus usage determination result for not permitting the usage of the multifunction device 1 as the transmission originator to the multifunction device 1 as the transmission originator of the user authentication request through the network 5 (refer to step S4 shown in FIG. 8, step SA3 shown in FIG. 10), thereby completing the user authentication operation.

In step SB9, after the server control unit 21 determines that the usage of the multifunction device 1 as the transmission originator is permitted, the server control unit 21 transmits the user authentication result for authenticating the user of the user information thus received, the apparatus usage determination result for permitting the usage of the multifunction device 1 as the transmission originator, and the user administration information corresponding to the user information thus received to the multifunction device 1 as the transmission originator of the user authentication request through the network 5 (refer to step S4 shown in FIG. 8, step SA3 shown in FIG. 10), thereby completing the user authentication operation.

As described above, in the embodiment, the administration server 2 performs the authentication determination relative to the user of the user information thus received, and the processing operation of the user authentication operation including the apparatus usage permission determination of the multifunction device 1.

As described above, in the image processing system in the embodiment, the administration server 2 stores the user administration information and the apparatus usage permission information. The user administration information includes the qualification information indicating the group to which the user belongs with respect to the user information of the user and the function usage permission setting. The apparatus usage permission information is provided for setting the multifunction device 1 as the usage permitted apparatus correlating to the qualification information indicating the specific group.

Further, in the embodiment, the image processing system is configured to obtain the qualification information indicating the group to which the user of the user information belongs from the user administration information according to the user information and the apparatus identification mark transmitted from the multifunction device 1. Further, the image processing system is configured to determine whether the multifunction device 1 is permitted to use by the user based on the apparatus usage permission information according to the qualification information and the apparatus identification mark. Accordingly, it is possible for the user in the specific group to user only the multifunction device 1 thus restricted, thereby making it possible to restrict the usage of other apparatus administrated through the image processing system.

Further, in the embodiment, the image processing system is configured to determine whether the usage of the image processing functions of the multifunction device 1 is permitted according to the function usage permission setting of the user administration information obtained by the multifunction device 1 from the administration server 2. Accordingly, it is possible for the user in the specific group to use only the specific one of the image processing functions of the multifunction device 1 thus restricted. In other words, it is possible to make only the specific one of the image processing functions of the multifunction device 1 thus restricted usable relative to the specific user.

In the embodiment, one multifunction device 1 is connected to the network 5. Alternatively, a plurality of multifunction devices may be connected to the network 5. In this case, the administration server 2 is configured to transmit the apparatus usage determination result to each of the multifunction devices according to the user authentication request transmitted from each of the multifunction devices.

As described above, in the embodiment, the multifunction device 1 is connected to the administration server 2 through the network 5. The multifunction device 1 includes the scanner unit 17, the printing unit 18, and the facsimile unit 19. The apparatus identification mark is set in the multifunction device 1 in advance. Further, the administration server 2 is configured to store the user administration information and the apparatus usage permission information. The user administration information includes the qualification information correlating to the user information of the user, and the function usage permission setting. The apparatus usage permission information indicates the usage permitted apparatus correlated to the qualification information.

Further, in the embodiment, the multifunction device 1 is configured to transmit the user information thus input and the apparatus identification mark to the administration server 2. Then, the administration server 2 is configured to obtain the usage permitted apparatus correlated to the qualification information according to the qualification information of the user administration information obtained based on the user information thus received. Then, the administration server 2 is configured to compare the apparatus identification mark thus received with the usage permitted apparatus to generate the apparatus usage determination result indicating whether the usage of the apparatus with the apparatus identification mark is permitted. When the apparatus usage determination result thus received indicates that the usage of the apparatus is not permitted, the multifunction device 1 is configured to display the apparatus usage denial notification relative to the user. Accordingly, it is possible for the specific user to use only the multifunction device 1 thus restricted.

Second Embodiment

A second embodiment of the present invention will be explained next with reference to FIGS. 13 to 17. Components in the second embodiment similar to those in the first embodiment are designated with the same reference numerals, and explanations thereof are omitted.

Figure 13:
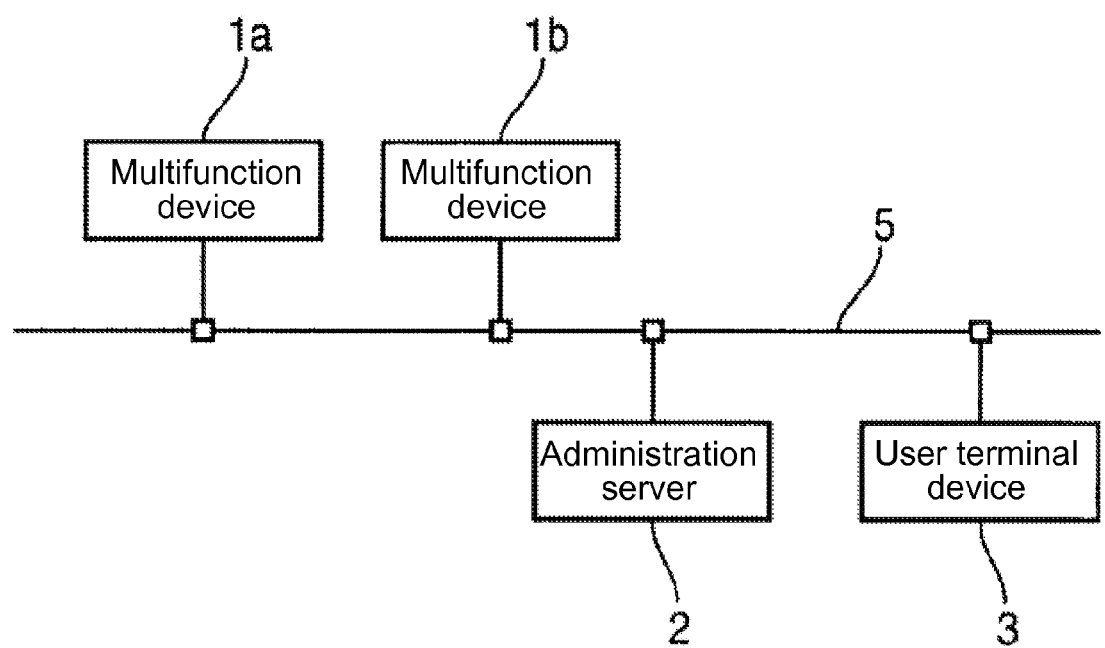
FIG. 13 is a block diagram showing a configuration of an image processing system according to a second embodiment of the present invention.

FIG. 13 is a block diagram showing a configuration of an image processing system according to the second embodiment of the present invention. As shown in FIG. 13, two multifunction devices 1a and 1b are connected to the network 5.

FIG. 14 is a block diagram showing a configuration of the multifunction device 1a or 1b of the image processing system according to the second embodiment of the present invention. As shown in FIG. 14, each of the multifunction devices 1a and 1b includes an apparatus state obtaining unit 41 for automatically obtaining a state of each of the multifunction devices 1a and 1b.

In the second embodiment, the multifunction devices 1a and 1b have a similar configuration. In the following description, when it is necessary to differentiate the multifunction devices 1a and 1b, the components of the multifunction devices 1a and 1b may be designated with letters such as control unit 11a and 11b, and the like.

FIG. 15 is a schematic view showing an example of a configuration of the apparatus usage permission information of the image processing system according to the second embodiment of the present invention.

In the second embodiment, the apparatus usage permission information is set and stored in the information storage unit 24 of the administration server 2 in advance.

As shown in FIG. 15, the apparatus usage permission information includes the qualification information including the title and the department; the usage permitted apparatus indicating the multifunction device 1 whose usage is permitted to the user belonging to the group of the qualification information; and a temporary usage permission setting indicating whether a temporary usage of apparatus other than the usage permitted apparatus is permitted to the user belonging to the group of the qualification information.

In the second embodiment, for example, the apparatus usage permission information is associated with the user belonging to the group having the title "General Manager" and the department "First Sales Department", the user belonging to the group having the title "Department Manager" and the department "First Sales Department", the user belonging to the group having the title "General Staff" and the department "First Sales Department", and the user belonging to the group having the title "General Staff" and the department "General Affair Department".

In the second embodiment, it is supposed that the user having the display name "Tanaka" (refer to FIG. 5) belongs to the group having the title "General Staff" and the department "First Sales Department", and the user transmits the print job from the user terminal device 3 to the multifunction device 1b. It is noted that the usage permitted apparatus is assigned to the multifunction device 1a relative to the user belonging to the group having the title "General Staff" and the department "First Sales Department". It is further supposed that the multifunction device 1a is not operable due to a cause such as toner shortage and the like. Further, it is noted that the multifunction device 1a has the apparatus identification mark "0057AH895F74", and the multifunction device 1b has the apparatus identification mark "0057AH895F73".

In the second embodiment, the multifunction device 1 is configured to perform the printing operation (refer to FIG. 8) and the function usage operation (refer to FIG. 10) similar to those in the first embodiment, and explanations thereof are omitted.

Figure 16:
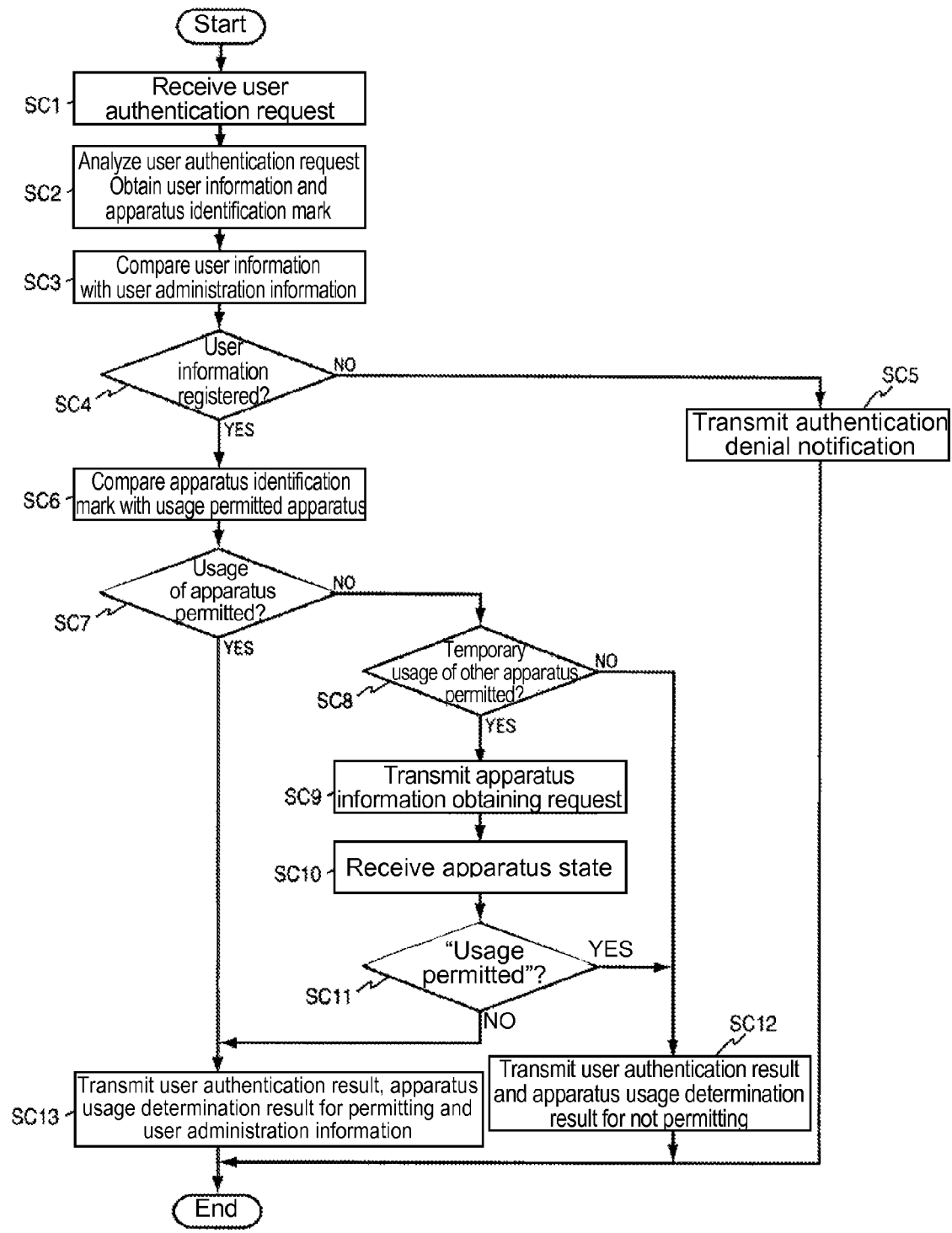
FIG. 16 is a flow chart showing an operation of the administration server of the image processing system in a user authentication operation according to the second embodiment of the present invention.

An operation of the administration server 2 of the image processing system in a user authentication operation will be explained next with reference to a flow chart shown in FIG. 16. FIG. 16 is the flow chart showing the operation of the administration server 2 of the image processing system in the user authentication operation according to the second embodiment of the present invention.

In the user authentication operation shown in FIG. 16, the user having the display name "Tanaka" transmits the print job generated with the user terminal device 3 to the multifunction device 1b, and the multifunction device 1b transmits the user authentication request with the user information and the apparatus identification mark attached thereto to the administration server 2. The processing operation from step SC1 to step SC5 is similar to the processing operation from step SB1 to step SB5 in the first embodiment (refer to FIG. 12), and an explanation thereof is omitted.

In the second embodiment, after the server control unit 21 determines that the user information is registered, the server control unit 21 reads the user administration information (refer to FIG. 5) corresponding to the user information from the information storage unit 24. Then, the server control unit 21 retrieves the apparatus usage permission information of the qualification information from the apparatus usage permission information (refer to FIG. 15) stored in the information storage unit 24 according to the qualification information of the user administration information. In step SC6, the server control unit 21 compares the apparatus identification mark obtained from the user authentication request with the usage permitted apparatus of the apparatus usage permission information.

In step SC7, after the server control unit 21 compares the apparatus identification mark with the usage permitted apparatus, the server control unit 21 determines whether the usage of the apparatus is permitted through determining whether the apparatus identification mark is included in the usage permitted apparatus. When the server control unit 21 determines that the usage of the apparatus is not permitted (No in step SC7), the server control unit 21 determines that the usage of the multifunction device 1*b* as the transmission originator is not permitted, and the process proceeds to step SC8. When the server control unit 21 determines that the usage of the apparatus is permitted (including direct match, Yes in step SC7), the server control unit 21 determines that the usage of the multifunction device 1*b* as the transmission originator is permitted, and the process proceeds to step SC13.

As described above, in the second embodiment, it is supposed that the multifunction device 1*a* is the usage permitted apparatus corresponding to the qualification information of the group that the user having the user ID "tanaka" belongs to. Accordingly, the apparatus identification mark of the multifunction device 1*b* is not included in the usage permitted apparatus (No in step SC7), and the process proceeds to step SC8.

In the second embodiment, after the server control unit 21 determines that the usage of the multifunction device 1*b* is not permitted, the server control unit 21 retrieves the temporary usage permission setting from the apparatus usage permission information thus retrieved. In step SC8, the server control unit 21 determines whether the temporary usage of other apparatus other than the usage permitted apparatus is permitted through determining whether the temporary usage permission setting of other apparatus is set as "Not permitted".

When the server control unit 21 determines that the temporary usage of other apparatus is not permitted (No in step SC8), the server control unit 21 determines that the usage of the multifunction device 1 as the transmission originator is not permitted, and the process proceeds to step SC12. When the server control unit 21 determines that the temporary usage permission setting is set as "Permitted", and the temporary usage of other apparatus is permitted (Yes in step SC8), the process proceeds to step SC9.

As described above, in the second embodiment, it is supposed that the temporary usage permission setting is set as "Permitted" relative to the qualification information of the group that the user having the user ID "tanaka" belongs to. Accordingly, the process proceeds to step SC9.

In the second embodiment, after the server control unit 21 determines that the user belonging to the group of the qualification information is permitted to use other apparatus, the server control unit 21 retrieves connection information of the usage permitted apparatus of the qualification information from the apparatus usage permission information. In step SC9, the server control unit 21 transmits the apparatus information obtaining request to the multifunction device 1 corresponding to the connection information (refer to step SD1 shown in FIG. 17) through the network 5.

As described above, in the second embodiment, it is supposed that the multifunction device 1*a* is the usage permitted apparatus corresponding to the qualification information of the group that the user having the user ID "tanaka" belongs to. Accordingly, the server control unit 21 transmits the apparatus information obtaining request to the multifunction device 1*a*.

In the second embodiment, after the server control unit 21 transmits the apparatus information obtaining request, the server control unit 21 waits for the response from the multifunction device 1 thus transmitted to. In step SC10, the server control unit 21 receives the apparatus state as the response from the multifunction device 1, and the process proceeds to step SC11.

In step SC11, after the server control unit 21 receives the apparatus state as the response from the multifunction device 1, the server control unit 21 determines whether the apparatus state of the multifunction device 1 is "Usage permitted". When the server control unit 21 determines that the apparatus state of the multifunction device 1 is "Usage permitted" (Yes in step SC11, the server control unit 21 determines that the user belonging to the group of the qualification information is permitted to temporarily use other apparatus, and the multifunction device 1*a* originally permitted is capable of performing the image processing function. Accordingly, the process proceeds to step SC12. When the server control unit 21 determines that the apparatus state of the multifunction device 1 is "Usage not permitted" (No in step SC11), the server control unit 21 determines that the user requests the temporary permission of the usage of the multifunction device 1*b*, and the multifunction device 1 originally permitted is capable of performing the image processing function. Accordingly, the process proceeds to step SC13.

As described above, in the second embodiment, it is supposed that the multifunction device 1*a* is the usage permitted apparatus corresponding to the qualification information of the group that the user having the user ID "tanaka" belongs to, and the multifunction device 1*a* is in the non-operable state. Accordingly, the process proceeds to step SC13.

As described above, the server control unit 21 determines that the usage of the multifunction device 1*b* as the transmission originator is not permitted through determining that the user is not permitted to temporarily use other apparatus in step SC8, and the process proceeds to step SC12. Further, the server control unit 21 determines that the user can use the multifunction device 1*a* originally permitted to perform the image processing function, and the process proceeds to step SC12.

In step SC12, the server control unit 21 transmits the user authentication result for authenticating the user of the user information thus received, and the apparatus usage determination result for denying the usage of the multifunction device 1 as the transmission originator to the multifunction device 1 as the transmission originator of the user authentication request (refer to step S4 shown in FIG. 8, step SA3 shown in FIG. 10), thereby completing the user authentication operation.

In the second embodiment, when the process proceeds from step SC11, it is configured to display that the multifunction device 1*a* can be used. When the control unit 11*b* of the multifunction device 1*b* receives the response in step S4, the control unit 11*b* transmits the apparatus usage denial notification indicating that the multifunction device 1*b* is not permitted to use and the multifunction device 1*a* can be used to the user terminal device 3 as the transmission originator of the print job in step S8. When the control unit 11 of the multifunction device 1 receives the response in step SA3, the control unit 11 displays the apparatus usage denial notification indicating that the multifunction device 1 is not permitted to use and the usage permitted apparatus can be used in step SA7.

As described above, in the second embodiment, the server control unit 21 determines that the multifunction device 1*b* as the transmission originator is permitted to use in step SC&, or the temporary usage of the multifunction device 1*b* is permitted in step SC11. In step SC13, the server control unit 21 transmits the user authentication result for authenticating the user of the user information thus received, the apparatus usage determination result for permitting the usage of the multifunction device 1*b* as the transmission originator, and the user administration information corresponding to the user information thus received to the multifunction device 1*b* as the transmission originator of the user authentication request (refer to step S4 shown in FIG. 8, step SA3 shown in FIG. 10) through the network 5, thereby completing the user authentication operation.

As described above, in the second embodiment, the administration server 2 performs the user authentication operation including the authentication determination relative to the user of the user information thus received and the apparatus usage permission determination of the multifunction device 1b as the transmission originator. It is noted that the administration server 2 performs the user authentication operation similarly when the user uses the image processing functions of the multifunction device 1b in the function usage operation.

Figure 17:
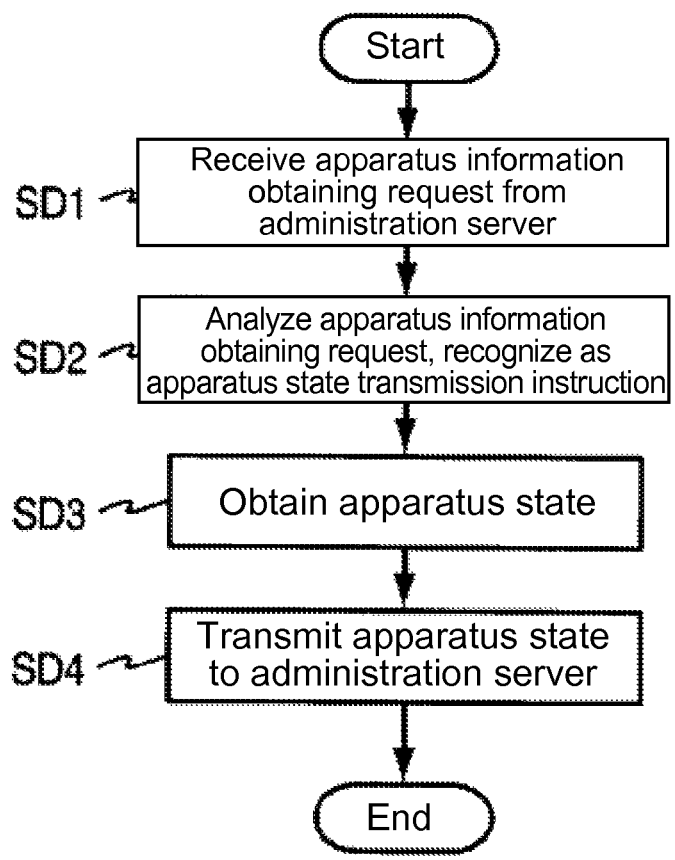
FIG. 17 is a flow chart showing an operation of the multifunction device of the image processing system in an apparatus state obtaining operation according to the second embodiment of the present invention.

An operation of the multifunction device of the image processing system in an apparatus state obtaining operation will be explained next with reference to a flow chart shown in FIG. 17. FIG. 17 is the flow chart showing the operation of the multifunction device 1a of the image processing system in the apparatus state obtaining operation when the multifunction device 1a receives the apparatus information obtaining request from the administration server 2 according to the second embodiment of the present invention.

In step SD1, the control unit 11a of the multifunction device 1a controls the communication unit 14 to receive the apparatus information obtaining request from the administration server 2 (refer to step SC9 shown in FIG. 16).

In step SD2, after the control unit 11a receives the apparatus information obtaining request, the control unit 11a controls the communication analysis unit 15 to analyze the apparatus information obtaining request thus received, so that the control unit 11a recognizes the apparatus information obtaining request as the apparatus state transmission instruction.

In step SD3, after the control unit 11a recognizes the apparatus information obtaining request as the apparatus state transmission instruction, the control unit 11a controls the communication unit 14 to obtain the apparatus state indicating whether the multifunction device 1a can be used or cannot be used.

In step SD4, after the control unit 11a obtains the apparatus state, the control unit 11a transmits the apparatus state thus obtained to the administration server 2 (refer to step SC10 shown in FIG. 16) through the network 5.

As described above, in the second embodiment, when the user tries to use other apparatus in the case that the user is permitted to use only specific apparatus and the specific apparatus cannot be used, it is configured to inquire the apparatus state to the specific apparatus originally permitted to use (the usage permitted apparatus). When the apparatus state indicates that the specific apparatus cannot be used, it is configured to permit the user to temporarily use the other apparatus originally not permitted to use. Accordingly, the user can use the other apparatus originally not permitted to use, thereby improving proficiency of the operation of the user.

In the first embodiment and the second embodiment, the multifunction device 1 is explained as the image forming apparatus. The present invention is not limited thereto, and the image forming apparatus may be a printing apparatus such as a printer and the like having one single image processing function, or an image processing apparatus such as a facsimile and the like. Further, in the first embodiment and the second embodiment, only the printing function and the scanning function of the multifunction device 1 are explained as an example, and the present invention is applicable to other functions of the multifunction device 1 such as a copying function, a facsimile function, and the like.

The disclosure of Japanese Patent Application No. 2011-121075, filed on May 30, 2011, is incorporated in the application by reference.

While the invention has been explained with reference to the specific embodiments of the invention, the explanation is illustrative and the invention is limited only by the appended claims.

What is claimed is:
1. An administration server, comprising:
a storage unit for storing a first correlation between first user information of a first user and first correlation between first identification information of a second image processing apparatus that the first user can use, and for storing a second correlation between second user information of a second user and second apparatus identification information of a first image processing apparatus that the second user can use;
a reception unit for receiving a user authentication request from the first user through the first image processing apparatus;
a second obtaining unit for obtaining an apparatus state of the second image processing apparatus that the first user can use;
a determining unit for determining whether the first user can use the first image processing apparatus according to the first correlation, the second correlation, the user authentication request, and the apparatus state of the second image processing apparatus; and
a second transmission unit for transmitting a determination result of the determining unit to the first image processing apparatus,
said determining unit is configured to determine whether the first user can use the first image processing apparatus according to the user authentication request from the first image processing apparatus,
said determining unit is configured to identify the second image processing apparatus that the first user can use when the determining unit determines that the first user cannot use the first image processing apparatus, and the determining unit so that the determining unit obtains the apparatus state of the second image processing apparatus thus identified as operable, and
said determining unit is configured to allow the first user to use the first image processing apparatus when the apparatus state indicate that the second image processing apparatus is not operable.

2. The administration server according to claim 1, further comprising an administration information storage unit for storing registered user identification information, usage permitted function information, and usage permitted apparatus information so that the registered user identification information, the usage permitted function information, and usage permitted apparatus information are correlated,
wherein said determining unit is configured to authenticate the first user according to user identification information and the registered user identification information, and
said control unit is configured to determine whether an apparatus corresponding to an apparatus identification information can be used according to the usage permitted apparatus information corresponding to the registered user identification information when the user identification information is registered.

3. The administration server according to claim 2, wherein said administration information storage unit is configured to store a first table in which the registered user identification information, the usage permitted function information, and qualification information are correlated, and said administration information storage unit is configured to store a second table in which the qualification information and the usage permitted apparatus information are correlated.

4. An image processing system, comprising:
a first image processing apparatus;
a second image processing apparatus; and
an administration server,
wherein said first image processing apparatus includes:
a first obtaining unit for obtaining user identification information of a first user; and
a first transmission unit for transmitting a user authentication request including the user identification information to the administration server,
said second image processing apparatus includes a detection unit for detecting an apparatus state of the second image processing apparatus,
said administration server includes:
a storage unit for storing a first correlation between first user information of the first user and first apparatus identification information of the second image processing apparatus that the first user can use, and for storing a second correlation between, second user information of a second user and second apparatus identification information of the first image processing apparatus that the second user can use;
a reception unit for receiving the user authentication request from the first user through the first image processing apparatus;
a second obtaining unit for obtaining the apparatus state of the second image processing apparatus that the first user can use;
a determining unit for determining whether the first user can use the first image processing apparatus according to the first correlation, the second correlation, the user authentication request, and the apparatus state of the second image processing apparatus; and
a second transmission unit for transmitting a determination result of the determining unit to the first image processing apparatus,
said determining unlit is configured to determine whether the first user can use the first image processing apparatus according to the user authentication request from the first image processing apparatus,
said determining unit is configured to identify the second image processing apparatus that the first user can use when the determining unit determines that the first user cannot use the first image processing apparatus, and the determining unit obtains the apparatus state of the second image processing apparatus thus identified as operable, and
said determining unit is configured to allow the first user to use the first image processing apparatus when the apparatus state indicates that the second image processing apparatus is not operable.

5. The image processing system according to claim 4, wherein said administration server further includes an administration information storage unit for storing registered user identification information, usage permitted function information, and usage permitted apparatus information so that the registered user identification information, the usage permitted function information, and usage permitted apparatus information are correlated,
wherein said determining unit is configured to authenticate the first user according to the user identification information and the registered user identification information, and
said determining unit is configured to determine whether an apparatus corresponding to an apparatus identification information can be used according to the usage permitted apparatus information corresponding to the registered user identification information when the user identification information is registered.

6. The image processing system according to claim 5, wherein said administration information storage unit is configured to store a first table in which the registered user identification information, the usage permitted function information, and qualification information are correlated, and
said administration information storage unit is configured to store a second table in which the qualification information and the usage permitted apparatus information are correlated.

7. The image processing system according to claim 4, wherein said first image processing apparatus further includes an operation unit for displaying a selection button corresponding to each of the image processing functions for executing the image processing functions, and
said determining unit is configured to control the operation unit so that the selection button corresponding to an unusable function cannot be selected according to the usage permitted function information.

8. The image processing system according to claim 4, wherein said first image processing apparatus further includes a notification unit for notifying at least one of the a first result and a second result.

9. The image processing system according to claim 5, wherein said first image processing apparatus further includes an apparatus state obtaining unit for obtaining a state of the first image processing apparatus, and
said reception unit is configured to receive the state of the first image processing apparatus.

10. The image processing system according to claim 5, wherein said administration information storage unit is configured to store temporary usage permitted apparatus information so that the temporary usage permitted apparatus information is correlated to the registered user identification information, and
said administration information storage unit is configured to obtain a state of the first image processing apparatus from the first image processing apparatus indicated by the usage permitted apparatus information corresponding to the registered user identification information corresponding to the user identification information when the temporary usage permitted apparatus information corresponding to the registered user identification information corresponding to the user identification information indicates that the apparatus can be used.

11. The image processing system according to claim 4, wherein said determining unit is configured to allow the first user to use the first image processing apparatus when the first user is set to a temporarily usage permit setting.

* * * * *